United States Patent [19]
Uemura et al.

[11] Patent Number: 5,495,254
[45] Date of Patent: Feb. 27, 1996

[54] DETECTION AND CALIBRATION OF HORIZONTAL ERROR IN A SCANNING TYPE RADAR DEVICE

[75] Inventors: Hiroki Uemura, Kure; Tadayuki Niibe, Hiroshima; Ayumu Doi, Hatsukaichi; Tohru Yoshioka, Hatsukaichi; Ken-ichi Okuda, Hatsukaichi; Yasunori Yamamoto, Higashihiroshima; Satoshi Morioka, Hiroshima; Tomohiko Adachi, Hatsukaichi, all of Japan

[73] Assignee: Mazda Motor Corporation, Hiroshima, Japan

[21] Appl. No.: 153,976

[22] Filed: Nov. 18, 1993

[30] Foreign Application Priority Data

Nov. 19, 1992 [JP] Japan ................... 4-309881

[51] Int. Cl.$^6$ .................. G01S 13/00; G01S 7/40
[52] U.S. Cl. .................................................. 342/174
[58] Field of Search ........................ 342/62, 63, 74, 342/75, 77, 173, 174, 165

[56] References Cited

U.S. PATENT DOCUMENTS 4,632,543  12/1986  Endo .......................................... 356/5
5,166,689  11/1992  Pankow et al. .......................... 342/77

FOREIGN PATENT DOCUMENTS

61-162776  7/1986  Japan .

*Primary Examiner*—Daniel T. Pihulic

[57] ABSTRACT

A method to determine a horizontal error of a radar device mounted on a vehicle along with the mounting error or imbalance in the diameters of wheels based on an echo signal from a reflector provided on a road. A vehicle's traveling locus is stored in advance as a reference locus obtained from the distance L between the vehicle and reflector and the direction $\theta_R$. A traveling locus when the vehicle is actually traveling in a straight line where the steering handle is kept in a neutral position is compared with the previously stored reference locus. A horizontal error is obtained from the traveling locus on the coordinate axis $\theta_R$ and the shift from the reference locus.

35 Claims, 9 Drawing Sheets

FIG. 1

IN NO HORIZONTAL ERROR CONDITION

FIG. 2

WITH HORIZONTAL ERROR

DETECTION AND CALIBRATION OF HORIZONTAL ERROR IN A SCANNING TYPE RADAR DEVICE

BACKGROUND OF THE INVENTION

1. Field of the Invention

The present invention relates to a detection method for detecting a horizontal error in a scanning type radar device mounted on a vehicle, and more particularly, to a detection method for detecting a horizontal error between a scanning center line and the traveling direction line of a vehicle during straight driving.

2. Description of the Related Art

Recent vehicles may carry a radar device to detect an object such as a vehicle ahead or other obstacles ahead in order to avoid collision. As disclosed in Japanese Kokai No. 61-162776, such radar device transmits a radar wave, e.g., a light wave, radio wave, or ultrasonic wave from a transmitter to the forwarding direction, receives the radar wave reflected by an obstacle at the receiver, and determines the distance between the obstacle and the vehicle based on the difference between the time of transmitting a radar wave and the time of receiving the reflected wave. Furthermore, it is possible to detect an obstacle and its direction in a rather wide range by using a radar device which scans by emitting radar waves from the right to the left.

The above-described scanning type radar device calculates the direction of an obstacle by using the line indicating a vehicle's traveling direction during straight driving where the steering angle is zero, as a reference line. Therefore, the radar device needs to be mounted onto a vehicle under the condition where a scanning center line of the radar device is coincident with the reference line. In this way, a vehicle's traveling direction during straight line driving gets coincident with the center line of the vehicle body (hereinafter referred to as a "vehicle-body center line"), and the scanning center line gets coincident with the vehicle's traveling direction.

However, a mounting error may occur when a scanning type radar is mounted onto a vehicle in an assembling plant. This mounting error is one of the causes generating horizontal errors of the scanning center line. This error may cause a detected distance and direction of an obstacle to be erroneous.

Figure 1:
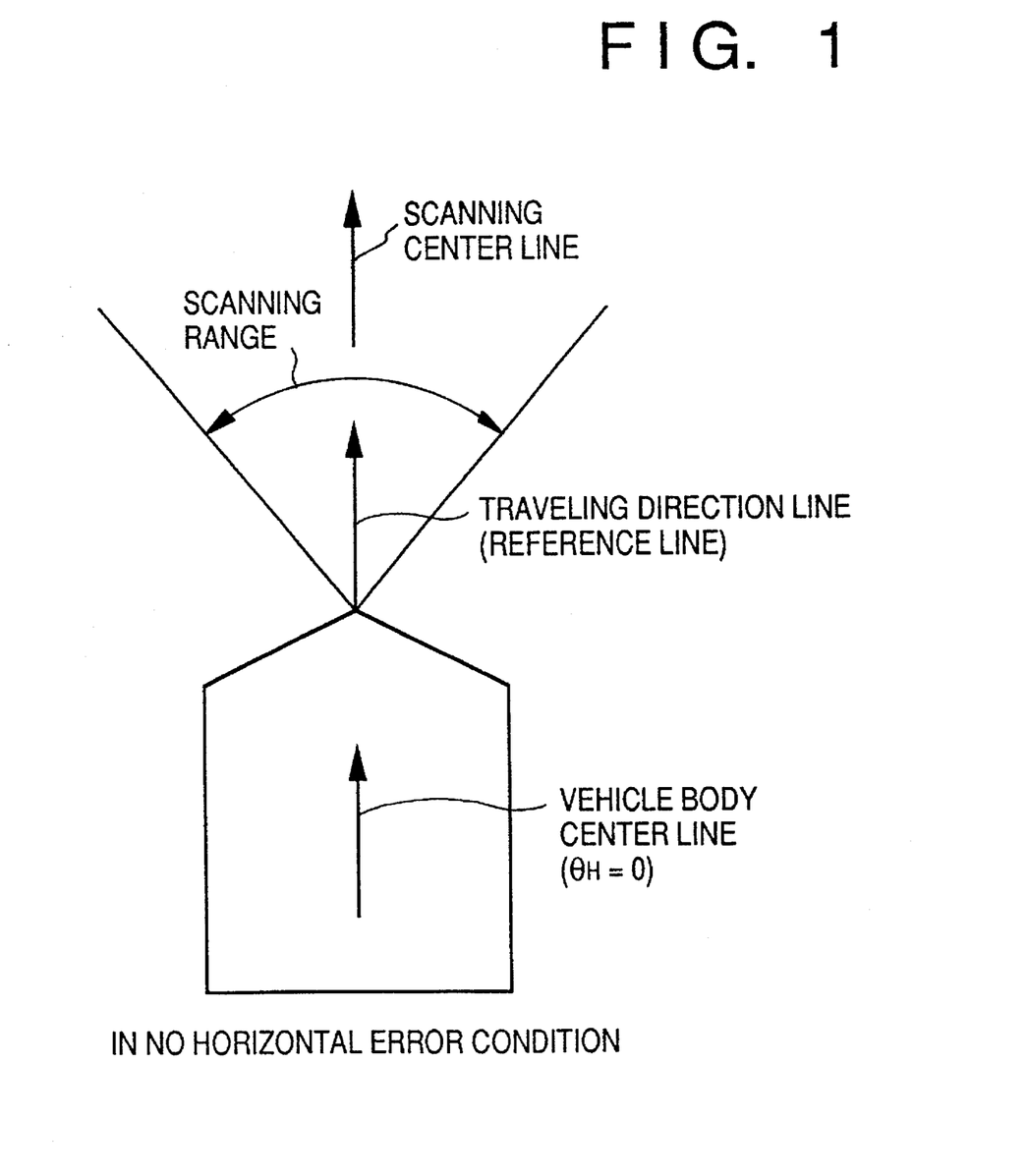
FIG. 1 is a diagram for explaining the relationship between the scanning center line and traveling direction line.
Figure 2:
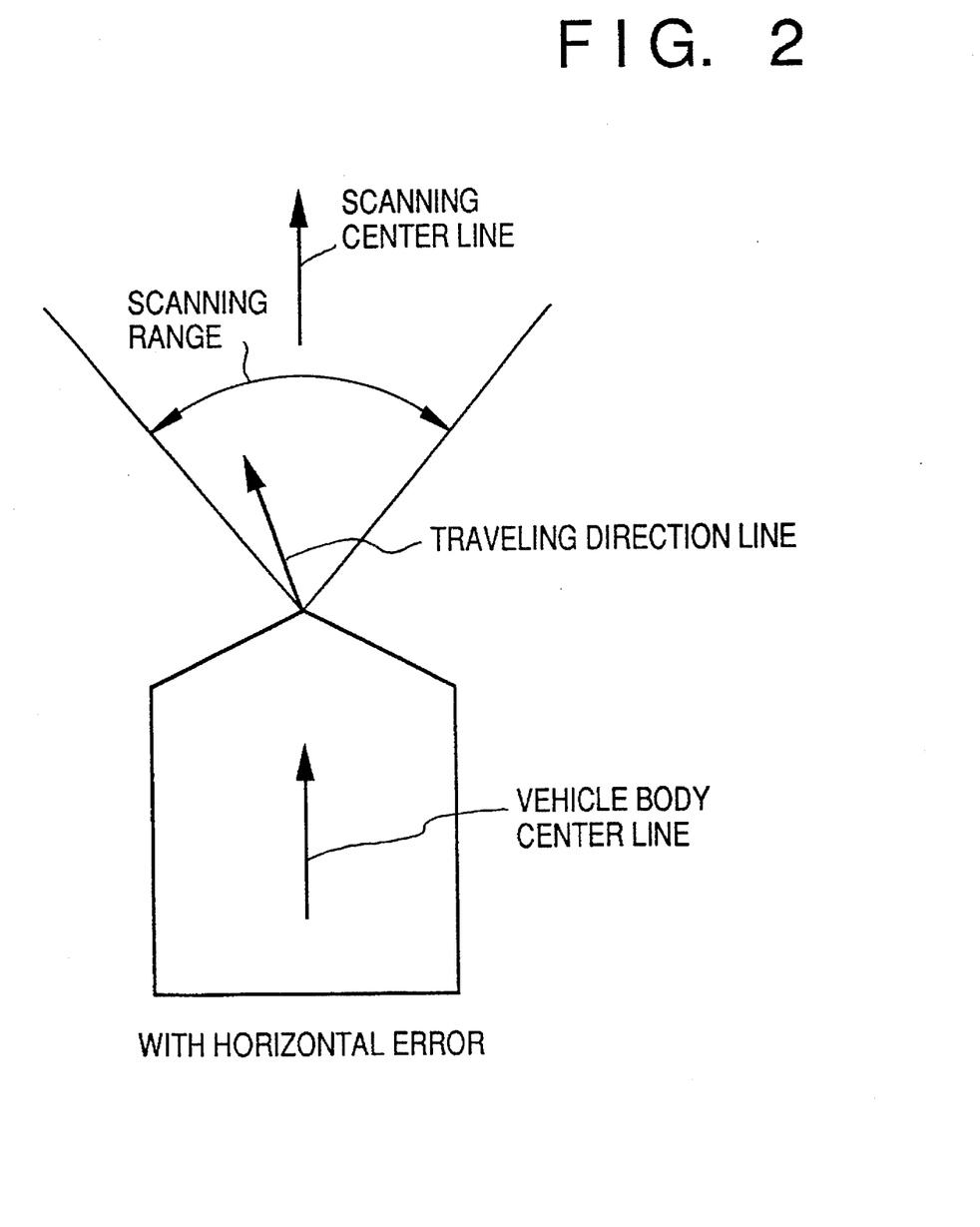
FIG. 2 is a diagram for explaining the reason for the occurrence of a horizontal error.

Furthermore, if the scanning center line is set to be coincident with the vehicle-body center line, when the diameter of left tires differs from that of right tires due to an imbalance of air pressure in each tire, the traveling direction line and vehicle body center line become not matched, as shown in FIG. 2. As described earlier, in the assembling plant, the radar is mounted onto a vehicle so that the scanning center line of the radar lies upon the vehicle-body center line where the steering handle of the vehicle is in a neutral position, and the diameters of both sides of tires are the same. However, after the mounting, if the diameter of one side of the tires becomes different from the other, the vehicle-body center line do not match with the scanning center line. This may cause an erroneous control in obstacle avoidance because the distance and direction of the obstacle is accurate only on the coordinate system of the radar where the neutral position of the steering handle is set to be the origin of the coordinate system.

SUMMARY OF THE INVENTION

Accordingly, it is an object of the present invention to provide a method capable of detecting a horizontal error in a scanning type radar device. The error is defined between the scanning center line and the vehicle's traveling direction line in straight line driving where the steering angle is zero. The method enables proper detection of an obstacle in the scanning type radar device. The horizontal error is caused by a mounting error or a difference between right and left wheels.

It is another object of the present invention to provide a method of obtaining a locus of a predetermined point in obstacle data detected by the radar device when the vehicle is actually driving on a straight road, and detecting the horizontal error from the difference between the obtained locus and a locus obtained in above without a horizontal error.

It is further another object of the present invention to properly detect an obstacle by using the detected horizontal error.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred two embodiments of the present invention will now be described in detail in accordance with the accompanying drawings.

System Construction

Figure 3:
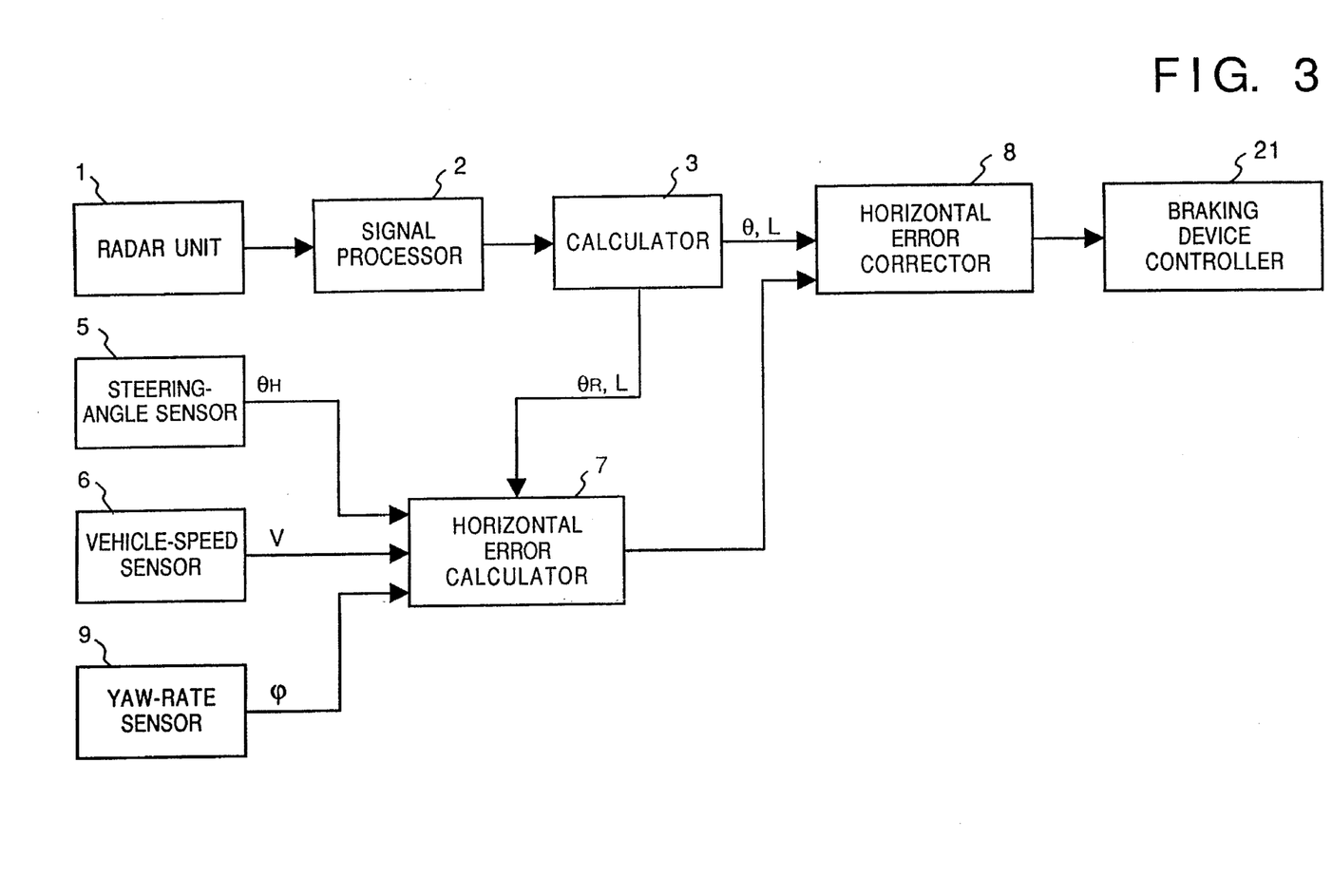
FIG. 3 is a block diagram of the scanning type radar device using the horizontal error detection method in accordance with the embodiments.

FIG. 3 is a block diagram of an obstacle detection system using a scanning type radar device which uses a horizontal error detection method in accordance with the embodiment. This system includes the radar device and an automatic braking device for automatically applying braking force to each wheel of the vehicle, and prepares information on obstacles detected by the radar device to be used for automatic control by the automatic braking device. In this system, the error of the scanning center line of the radar device is calibrated to maintain an accuracy in obstacle detection.

In FIG. 3, numeral 1 is a radar unit mounted on the front portion of the vehicle. The head of the radar unit 1 transmits a pulsed laser beam as a radar wave from a transmitter in the forwarding direction, and receives the reflected wave in a receptor. The radar unit 1 is a scanning type unit which scans pulse radar beams transmitted from the transmitter in the horizontal direction in a relatively wide angle. The signal received by the radar unit 1 is inputted into a calculator 3 via a signal processor 2. The calculator 3 calculates each distance between the vehicle and obstacles scattered within the scanning range and the directions of the obstacles based on an elapsed time between the transmission and the reception of the laser beam.

Numeral 5 is a steering angle sensor for detecting the steering angle of a steering handle (hereinafter referred to as "steering angle") and numeral 6 is a vehicle-speed sensor. Detection signals of the sensors 5 and 6 are inputted into a horizontal error detector 7. The detector 7 detects a horizontal error between the scanning center line of the radar unit 1 and a traveling direction line of the vehicle (where the steering angle is zero) based on the obstacle data calculated by the calculator 3, which are the distance between each obstacle and the vehicle and the direction of each obstacle. The horizontal error detected by the detector 7 is inputted into a horizontal-error corrector 8. The corrector 8 corrects the obstacle data calculated by the calculator 3 so as to cancel the horizontal error. The corrected obstacle data is inputted into an automatic braking device controller 21 and used for judgment of possibility of a collision with the obstacle.

A yaw rate sensor 9 of FIG. 3 is used for a horizontal error detection method according to the second embodiment.

In the following description, two types of errors are considered as a cause of horizontal error generation: (1) A mounting error of the radar unit onto the vehicle; and (2) An error in posture of the vehicle. It should be noted that an error generated when the radar device properly mounted in the mounting is later displaced is referred to a "mounting error". On the other hand, an error caused by imbalance of air pressure between right and left wheels is referred to as "vehicle posture error".

First Embodiment

Figure 4:
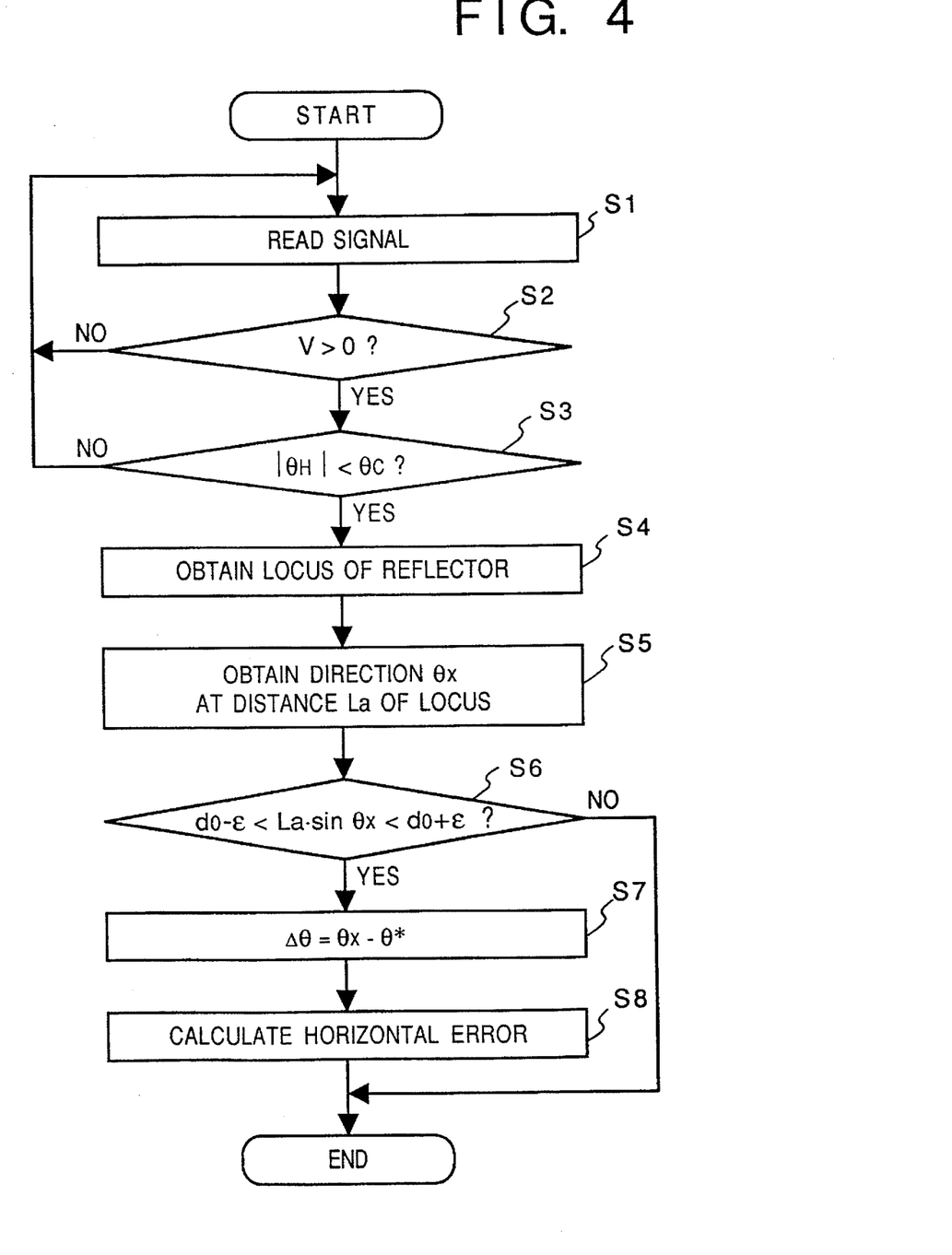
FIG. 4 is a flowchart for explaining the horizontal error detection method according to a first embodiment.

The horizontal error detection method by the calculator 7 in accordance with the first embodiment is described with reference to the flowchart shown in FIG. 4.

Figure 5:
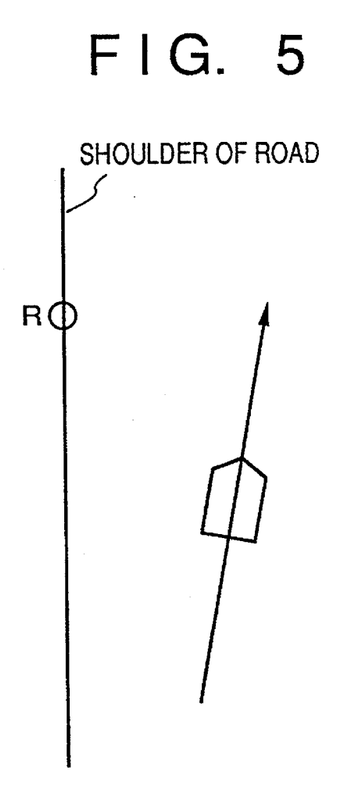
FIGS. 5 and 6 are diagrams for explaining the vehicle direction when the horizontal error according to the first embodiment is detected.
Figure 6:
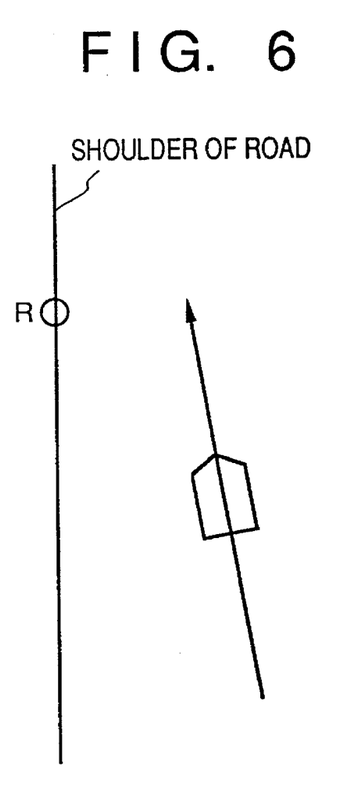
Figure 8:
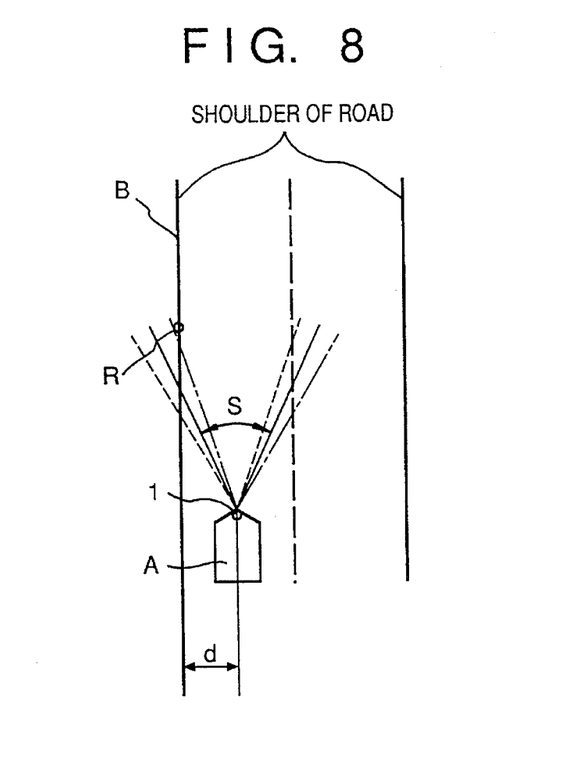
FIG. 8 is a diagram for explaining the reason for occurring a horizontal error.

Detection and calibration of a horizontal error are performed according to the embodiment when the vehicle A travels a straight road B as shown in FIG. 8. Accordingly, a condition when the detection and calibration are performed is such that a vehicle speed V detected by the vehicle speed sensor 6 (at step S1) is larger than zero, and the absolute value of the steering angle $\theta_H$ smaller than the play $\theta_C$ of the steering handle ($|\theta_H|<\theta_C$) (steps S2 and S3). That is, since the error detection in this system is operated when the steering handle is maintained at around the neutral position, the vehicle travels in parallel to the shoulder of the straight road in a case where the radar unit 1 is mounted so as to include the "mounting error". On the other hand, when the vehicle travels the left lane straight and the radar unit 1 has the "posture error" it travels so as to swerve from the shoulder of the road as shown in FIG. 5 (when the diameter of the right wheel is smaller than that of the left) or toward the left shoulder of the road as shown in FIG. 6 (when the diameter of the right wheel is larger than that of the left).

When the conditions are satisfied and it is judged that the vehicle A travels the road B in a straight manner, at step S4, data on a reflector R which is provided on the left edge of the road B as a "predetermined point" is taken out of the data on obstacles which are detected and calculated by the radar unit 1 and calculator 3, respectively.

Since the reflector R has high reflective efficiency, the area in which amplification is particularly large in the echo signal received by the radar unit 1 is determined as a reflection wave. In this method, the calculator 3 continuously detects a position change of the reflector along with the vehicle movement. The calculator 7 forms a locus of the reflector R in a memory (not shown) of the calculator 7. The locus is in terms of a distance L between the reflector R and the vehicle A, and a direction $\theta_R$ of the vehicle A from the reflector R (step S4). The direction $\theta_R$ is expressed by an angle between the scanning center line of the radar unit 1 and a line connecting the vehicle A and the reflector R, and exhibits a positive value when the reflector R is located on the right side of the scanning center line.

Figure 7:
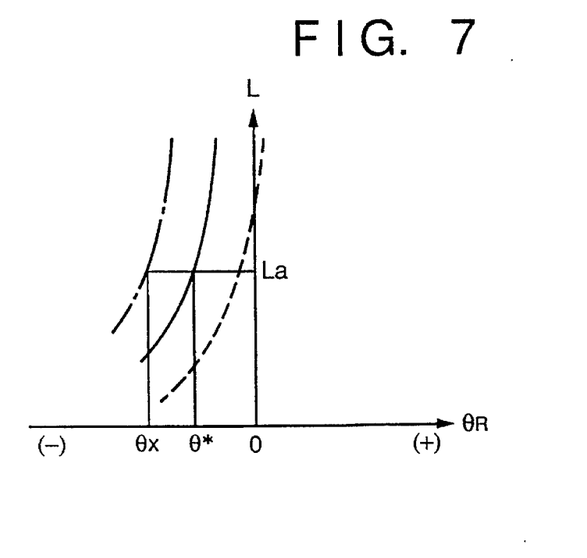
FIG. 7 is a diagram illustrating the locus of a reflector on the coordinate.

FIG. 7 shows an example of a locus of the reflector R. In this example, a vertical axis represents the distance L, while the horizontal axis represents the direction $\theta_R$.

When the traveling direction line (a line along with the road B) of the vehicle A in straight driving is coincident with the scanning center line of the radar unit 1, that is, when there are no horizontal errors (neither "mounting error" nor "posture error") in the traveling direction, the scanning area S of a radar beam is symmetrical as shown in FIG. 8. The locus of the reflector R on the coordinate is located in a negative area in the axis of the direction $\theta_R$ as indicated by a solid line (hereinafter referred to as a "reference locus") in FIG. 7. The characteristic of the reference locus is such that as the distance L increases (that is, the case where the reflector R is located far ahead of the vehicle), the curve line approaches the vertical axis (L axis). While as the distance L approaches zero (that is, the case where the reflector R is close ahead of the vehicle), the curve approaches the horizontal axis.

On the contrary, when a mounting error exists, the traveling direction line and the scanning center line of the radar unit 1 do not coincide, and the scanning area S of the laser beam is shifted to the left side in the traveling direction as indicated by a dashed line in FIG. 8. Consequently the locus of the reflector R is a locus shifted in the positive direction in the horizontal axis with respect to the reference locus. Furthermore, when the scanning area S of the laser beam is shifted to the right side in the traveling direction as indicated by an alternate long and short dash line in FIG. 8, the locus of the reflector R is a locus shifted in the negative direction in the horizontal axis. This is because the distance L and direction θ are erroneously detected when the "mounting error" exists.

Figure 9:
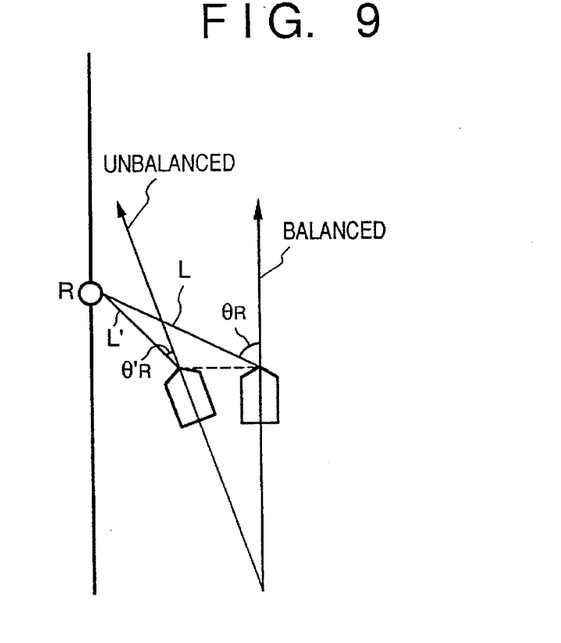
FIG. 9 is a diagram for explaining the reason why the occurrence of horizontal errors effects on the locus of the reflector.

On the other hand, when a "posture error" exists (when the diameters of right and left wheels are unbalanced), for example, when the diameter of the left wheel is smaller than that of the right wheel, as shown in FIG. 9, it is expressed by:

$\theta'_R < \theta_R$ $L' < L$

In FIG. 9, the line indicated as "balanced" refers to the traveling direction when there is no difference between the diameters of right and left wheels, and the vehicle travels in parallel to the shoulder of the road B. While the line indicated as "unbalanced" refers to the traveling direction when the left wheel is smaller than the right wheel, and the vehicle approaches the left shoulder of the road B. It should be noted that "$\theta_R$" and "L" respectively express the direction and distance of the reflector R when the vehicle is traveling in parallel to the shoulder of the road. While "$\theta'_R$" and "L'" express the direction and distance of the reflector R when the vehicle travels toward the shoulder of the road.

In light of FIGS. 7–9, when there is a "posture" error or a mounting error, the tendency shown in FIG. 7 appears similarly.

Figure 10:
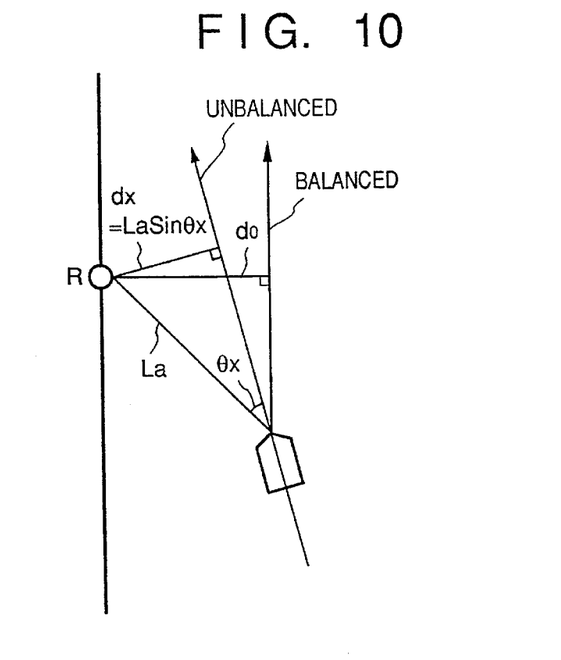
FIG. 10 is a diagram for explaining a timing of detecting a horizontal error.

In steps S5 and S6, it is judged whether or not it is a time for performing the error detection. In the system, the error detection is performed when the distance between the vehicle A and the edge of the road B (when the vehicle travels the left lane) is not much different from $d_0$ (see FIG. 10). That is, the direction $\theta_x$ of the reflector R when the distance L between the vehicle A and the reflector R is a predetermined distance La (see FIG. 7) is obtained at step S5. As indicated in FIG. 10, the distance $d_x$ (=La·sin$\theta_x$) between the body center line of the vehicle A and the left edge (shoulder) of the road is calculated using the value of the direction $\theta_x$. Subsequently, it is confirmed that the distance $d_x$ is within a predetermined error threshold $\epsilon$ with respect to the distance $d_0$. The relationship expressed by:

$$|d_x - d_0| < \epsilon \quad (1)$$

means that the vehicle is at a position close to the reference locus, that is, at a position appropriately apart from the shoulder of the road. If the expression (1) is not satisfied, that is, if it is judged as "NO" at step S6, the error detection is not performed.

If the expression (1) is satisfied, the difference $\Delta\theta$ between the direction $\theta_x$ and the direction $\theta^*$ corresponding to the distance $L_a$ in the reference locus (FIG. 7), that is, the shift in the horizontal direction in the locus of the reflector R and the reference locus is calculated. Subsequently, the horizontal error is calculated from the $\Delta\theta$ (step S8). In this way, the detection process of the horizontal errors is completed.

The horizontal error calculated by the calculator 7 is transmitted to the corrector 8. The corrector 8 corrects horizontal error based on the distance L and the distance $\theta$ calculated by the calculator 3.

The above-described process obtains the locus of the single reflector R on the left side of the road from the data on obstacles detected by the radar unit 1 when the vehicle is traveling the road straight, and detects a horizontal error from the difference between the obtained locus and the reference locus. Accordingly, if the horizontal error is such that the scanning center line of the radar unit 1 and the traveling direction line when the steering angle is zero do not coincide because the mounting error or the posture error exists, the detection of the obstacles with canceling the horizontal error can be properly performed, accuracy and reliability of the obstacle detection can be improved.

Moreover, in the above embodiment, in order to obtain the locus of the reflector R, the distance L between the vehicle A and the reflector R is represented on the vertical axis, while the direction $\theta$ of the reflector R is represented on the horizontal axis on the coordinate system. Since the distance L and the direction $\theta$, elements of the coordinate system are calculated in the calculator 3 of the radar device, obtaining the locus of the reflector R can be easily obtained in a short period of the time.

Second Embodiment

In the first embodiment, it is required to maintain the steering handle in the neutral position. In the case where the vehicle is subject to a posture error, as shown in FIGS. 5 and 6, the vehicle is not traveling in parallel to the shoulder of the road, thus giving the driver a strange feeling. The second embodiment solves this problem by detecting the error where the vehicle is traveling the road straight while the vehicle is subject to the posture error.

Similar to the first embodiment, in the detection method of the second embodiment, it is important that the vehicle is in straight line driving. In the second embodiment, the fact that the vehicle is traveling straight is confirmed based on an output of the yaw rate sensor 9.

Figure 11:
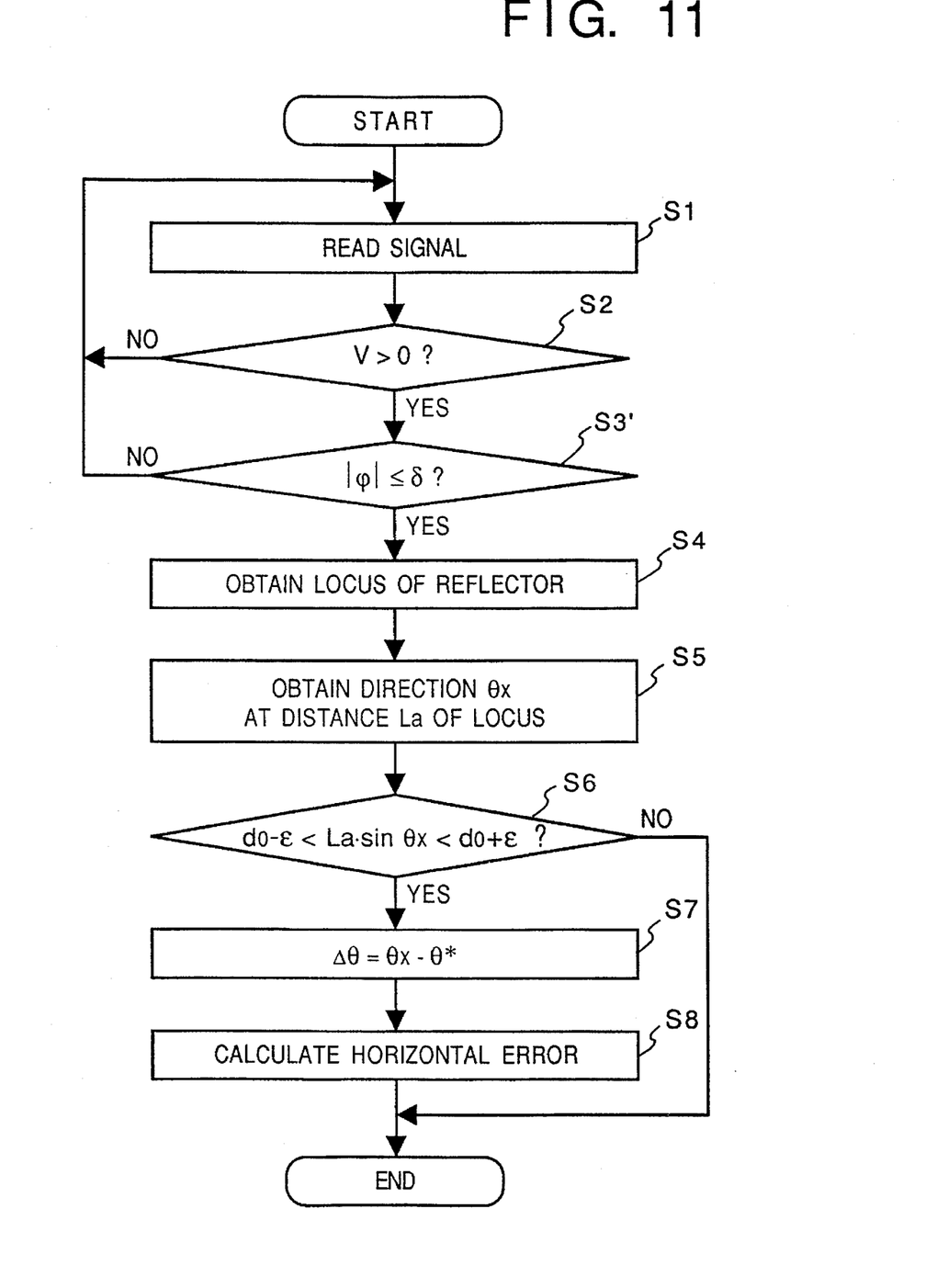
FIG. 11 is a flowchart for explaining the horizontal detection method according to a second embodiment.

FIG. 11 is a flowchart concerning the control procedure in accordance with the second embodiment. The flowchart of FIG. 11 of the second embodiment differs from that of FIG. 4 of the first embodiment in providing step S3' instead of step S3. When the signal $\phi$ from the yaw rate sensor 9 is small enough ($|\phi| \leq \delta$) at step S3 is confirmed, it means that the vehicle is traveling straight. The control procedure of the second embodiment is the same as that of the first embodiment with the exception of step S3'.

According to the method of the second embodiment, in the case where the vehicle is subject to a mounting error, the traveling direction and the vehicle body center line coincide as far as the driver maintains the steering handle in the neutral position and the scanning center line is deviated from the traveling direction. Thus, a locus (shown in FIG. 7) which is the same as that of the first embodiment can be obtained. Thus, a horizontal error can be calculated.

Figure 12:
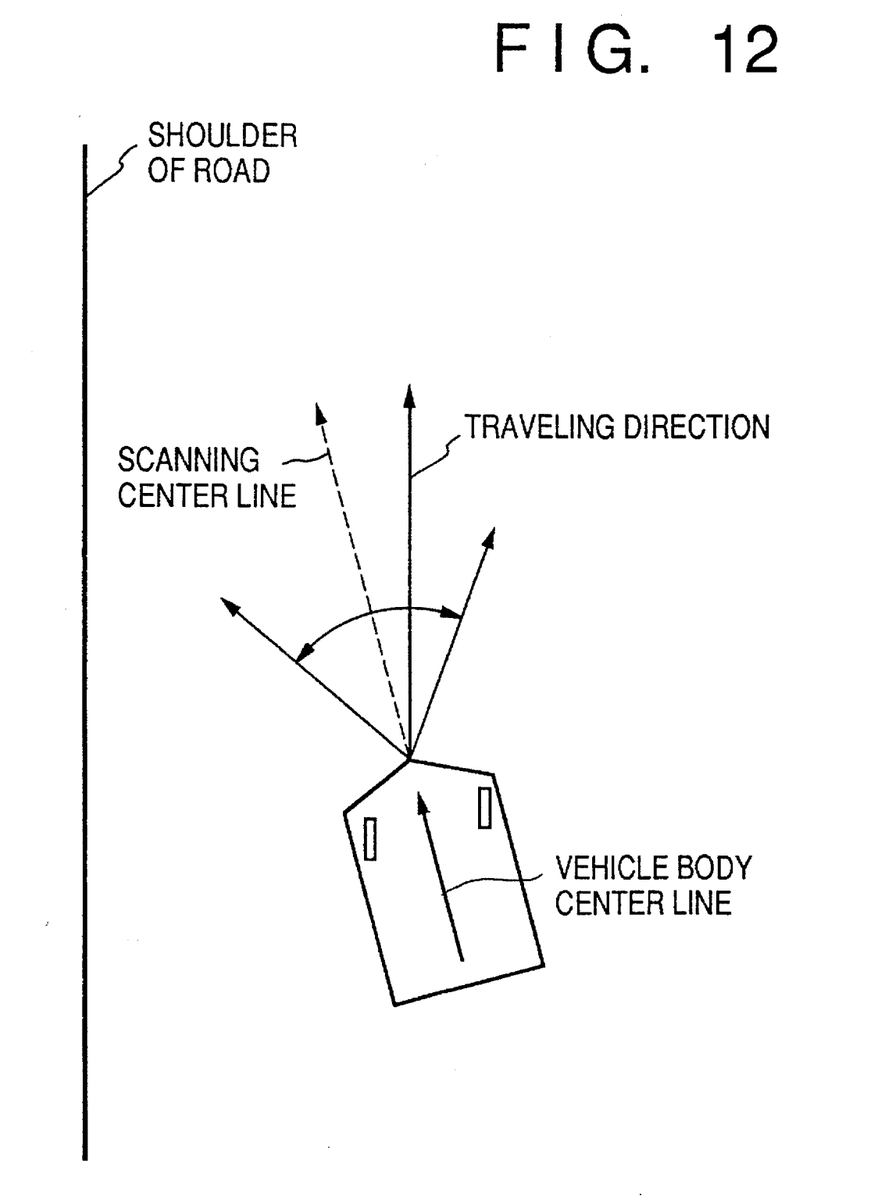
FIG. 12 is a diagram for explaining the principle of the horizontal error detection method of the second embodiment.

In the case where the vehicle is subject to a posture error, the driver needs to turn the steering handle slightly in order to maintain the vehicle position in parallel to the road. In this state, the traveling direction of the vehicle is parallel to the shoulder of the straight road, however, as shown in FIG. 12, the vehicle-body center line has a tilt to the left in the traveling direction. Since the radar unit 1 is mounted on the vehicle body without a mounting error, when the vehicle-body center line has a tilt to the shoulder of the road, the scanning center line of the radar unit 1 has a tilt to the shoulder of the road. This state is the same as the case where the vehicle is subject to a mounting error. That is, according to the second embodiment, when the vehicle is subject to the posture error, a horizontal error can be detected under the state where the vehicle's traveling direction is parallel to the shoulder of the road, thus eliminating the effect on the driver.

Modification

The present invention is not limited to the above two embodiments and various modifications are possible. For example:

(1) In the above embodiments, a single reflector R provided on the left edge of the road is used as a predetermined point to obtain the locus. However, this does not impose a limitation upon the invention. For example, when a plurality of reflectors are provided in a predetermined interval on the both edges of a road, data on obstacles detected by a radar device (i.e. radar unit 1), a centroid of the whole obstacles is calculated, and the locus of the centroid is obtained by continuously attaining the centroid in a predetermined period. This locus can be a locus of a "predetermined point".

(2) In the above embodiments, the locus of the predetermined point (reflector R) is represented by a vertical axis, while the distance L between the vehicle and the reflector R is represented by a horizontal axis. However, this does not impose a limitation upon the invention. For example, the locus of the predetermined point can be expressed by a plan coordinate so that the vehicle's direction corresponds to the x-axis and the direction perpendicular to the vehicle's direction corresponds to the y-axis. In this case, when there is no horizontal error between the scanning center line of the radar device and the vehicle's traveling direction in straight line driving where the steering angle is zero, the locus of the predetermined point is a line parallel to the x-axis, however, when there is a horizontal error, the locus of the predetermined point is a slant line with respect to the x-axis. A horizontal error can be obtained from this tilt angle.

As many apparently widely different embodiments of the present inventions can be made without departing from the spirit and scope thereof, it is to be understood that the invention is not limited to the specific embodiments thereof except as defined in the appended claims.

What is claimed is:

1. A method of detecting a horizontal error which is an error in a horizontal plane between a scanning center line of a scanning type radar device mounted on a vehicle and the vehicle's traveling direction during straight line driving where a steering angle of the vehicle is substantially zero, comprising:

a storing step of storing a reference locus of a reference point at a predetermined position previously obtained by a radar device when the vehicle is not subject to a horizontal error, during straight line driving;

a locus calculation step of obtaining a locus of a predetermined point from data on obstacles detected by a radar device when the vehicle actually travels on a road; and a detection step of detecting a horizontal error from the difference between the locus obtained in the locus calculation step and the previously stored reference locus.

2. The method according to claim 1, wherein the horizontal error is obtained based on an angle between the scanning center line and the traveling direction line.

3. The method according to claim 1, wherein the horizontal error occurs from an error caused when the radar device is mounted onto the vehicle.

4. The method according to claim 1, wherein the horizontal error occurs by imbalance between the diameter of right wheel and that of left wheel.

5. The method according to claim 1, wherein a reference distance between the traveling direction line and the reference point when the vehicle is traveling in a straight line is also stored in said storage step, and the horizontal error is detected in said detection step when the distance between the vehicle's traveling direction line and the predetermined point is substantially equal to the reference distance.

6. The method according to claim 1, wherein said reference point is a reflector provided at an edge of the road.

7. The method according to claim 1, wherein the locus of the reference point, is represented by the distance between the vehicle and the reference point on the vertical axis and the direction on the horizontal axis in said locus calculation step.

8. The method according to claim 7, wherein a horizontal error is detected from the locus of the predetermined point and the shift of the reference locus in the horizontal direction in said detection step.

9. The method according to claim 1, wherein the vehicle includes a control device which executes obstacle avoidance based on the distance and direction of the obstacle detected by the radar device, and corrects the distance and direction detected by said radar device based on the horizontal error.

10. The method according to claim 1, wherein said locus calculation step includes a step of confirming that a steering handle is maintained in the vicinity of a neutral position.

11. The method according to claim 1, wherein said locus calculation step includes a step of confirming that the vehicle is not turning.

12. A method of detecting a horizontal error which is a deviation in a horizontal plane of a scanning center line of a scanning type radar device mounted on a vehicle with respect to the vehicle's traveling direction dung straight line driving where a steering angle of the vehicle is substantially zero, comprising:

a locus calculation step of calculating a movement locus of a predetermined point on a road while the vehicle travels on the road, the calculation of locus being made based on relative position data of the predetermined point with respect to the vehicle position; and a detection step of detecting the horizontal error by comparing the locus obtained in the locus calculation step with a previously Stored reference locus which is represented by relative position data of a reference point with respect to the vehicle and which is previously stored.

13. The method according to claim 12, wherein the deviation occurs from an error caused when the radar device is mounted onto the vehicle.

14. The method according to claim 12, wherein the horizontal error occurs by imbalance between a diameter of a right wheel and a diameter of a left wheel.

15. The method according to claim 12, wherein a reference distance between the traveling direction line and the reference point when the vehicle is traveling in a straight line is previously stored, and the horizontal error is detected in said detection step when the distance between the vehicle's traveling direction line and the predetermined point is substantially equal to the reference distance.

16. The method according to claim 12, wherein said reference point is a reflector provided at an edge of the road.

17. The method according to claim 12, wherein the reference locus of the, reference point is represented by the distance between the vehicle and the reference point on the vertical axis and the direction on the horizontal axis.

18. The method according to claim 17, wherein the horizontal error is detected from the locus of the predetermined point and the shift of the reference locus in the horizontal direction in said detection step.

19. The method according to claim 12, wherein the vehicle includes a control device which executes obstacle avoidance based on the distance and direction of the obstacle detected by the radar device, and corrects the distance and direction detected by said radar device based on the horizontal error.

20. The method according to claim 12, wherein said locus calculation step includes a step of confirming that a steering handle is maintained in the vicinity of a neutral position.

21. The method according to claim 12, wherein said locus calculation step includes a step of confirming that the vehicle is not turning.

22. The method according to claim 9, wherein a reference distance between the traveling direction line and the reference point when the vehicle is traveling in a straight line is also stored in said storage step, and the horizontal error is detected in said detection step when the distance between the vehicle's traveling direction line and the predetermined point is substantially equal to the reference distance.

23. The method according to claim 9, wherein said locus calculation step includes a step of confirming that a steering handle is maintained in the vicinity of a neutral position.

24. The method according to claim 9, wherein said locus calculation step includes a step of confirming that the vehicle is not turning.

25. An apparatus for detecting a horizontal error which is an error in a horizontal plane between a scanning center line of a scanning type radar device mounted on a vehicle and the vehicle's traveling direction during straight line driving where a steering angle of the vehicle is substantially zero, comprising:

storage means for storing a reference locus of a reference point at a predetermined position previously obtained by a radar device when the vehicle is not subject to a horizontal error, during straight line driving;

locus calculation means for calculating a locus of a predetermined point from data on obstacles detected by a radar device when the vehicle actually travels on a road; and detection means for detecting a horizontal error from the difference between the locus obtained by the locus calculation means and the previously stored reference locus.

26. The apparatus according to claim 25, wherein the horizontal error is calculated based on an angle between the scanning center line and the traveling direction line.

27. The apparatus according to claim 25, wherein the horizontal error occurs from an error caused when the radar device is mounted onto the vehicle.

28. The apparatus according to claim 25, wherein the horizontal error occurs by imbalance between the diameter of a right wheel and that of a left wheel.

29. The apparatus according to claim 25, wherein a reference distance between the traveling direction line and the reference point when the vehicle is traveling in a straight line is also stored into said storage means, and the horizontal error is detected when the distance between the vehicle's traveling direction line and the predetermined point is substantially equal to the reference distance.

30. The apparatus according to claim 25, wherein said reference point is a reflector provided at an edge of the road.

31. The apparatus according to claim 25, wherein the locus of the reference point is represented by the distance between the vehicle and the reference point on the vertical axis and the direction on the horizontal axis by said locus calculation means.

32. The apparatus according to claim 31, wherein the horizontal error is detected from the locus of the predetermined point and the shift of the reference locus in the horizontal direction by said detection means.

33. The apparatus according to claim 25, wherein the vehicle includes a control device which executes obstacle avoidance based on the distance and direction of the obstacle detected by the radar device, and corrects the distance and direction detected by said radar device based on the horizontal error.

34. The apparatus according to claim 25, wherein said locus calculation means includes means for confirming that a steering handle is maintained in the vicinity of a neutral position.

35. The apparatus according to claim 25, wherein said locus calculation means includes means for confirming that the vehicle is not turning.

* * * * *

UNITED STATES PATENT AND TRADEMARK OFFICE
CERTIFICATE OF CORRECTION

PATENT NO. : 5,495,254
DATED : February 27, 1996
INVENTOR(S) : Hiroki Uemura et al.

It is certified that error appears in the above-indentified patent and that said Letters Patent is hereby corrected as shown below:

IN THE CLAIMS:

Column 8, line 23, claim 12, change "dung" to --during--.

Column 8, line 33, claim 12, change "Stored" to --stored--.

Signed and Sealed this

Fourteenth Day of May, 1996

Attest:

BRUCE LEHMAN

Attesting Officer            Commissioner of Patents and Trademarks